United States Patent
Kaiser et al.

[11] 3,951,908
[45] Apr. 20, 1976

[54] FLAME-PROOFING, HIGH MELTING POINT THERMOPLASTIC POLYMERS WITH LACTAM-IMPREGNATED RED PHOSPHORUS

[75] Inventors: Otto Kaiser; Anton Cadus, Ludwigshafen, both of Germany

[73] Assignee: Badische Anilin- & Soda Fabrik Aktiengesellschaft, Ludwigshafen (Rhine), Germany

[22] Filed: May 8, 1974

[21] Appl. No.: 468,179

Related U.S. Application Data
[63] Continuation-in-part of Ser. No. 102,144, Dec. 28, 1970, abandoned.

[30] Foreign Application Priority Data
Dec. 31, 1969 Germany.......................... 1965635

[52] U.S. Cl.................... 260/45.7 P; 106/15 FP; 260/30.6 R; 260/67 FP; 260/75 P; 260/78 R; 260/860; 360/DIG. 24
[51] Int. Cl.$^2$..................... C08K 3/32; C08L 59/02; C08L 67/00; C08L 77/02
[58] Field of Search............. 260/45.7 P; 106/15 FP; 260/DIG. 24; 423/322

[56] References Cited
UNITED STATES PATENTS

| | | | |
|---|---|---|---|
| 2,846,332 | 8/1958 | Nesty................................. | 106/308 |
| 3,496,133 | 2/1970 | Hoffman............................ | 260/40 P |
| 3,560,430 | 2/1971 | Meyer et al....................... | 260/37 |
| 3,663,174 | 5/1972 | Dany et al. ........................ | 423/322 |
| 3,694,402 | 9/1972 | Essam............................... | 260/40 P |
| 3,808,127 | 4/1974 | Sander et al. .................... | 106/15 FP |

FOREIGN PATENTS OR APPLICATIONS

| | | | |
|---|---|---|---|
| 1,147,009 | 4/1969 | United Kingdom ............ | 260/45.7 P |
| 1,157,419 | 6/1969 | United Kingdom ............ | 260/45.7 P |

OTHER PUBLICATIONS
Modern Plastics Encyclopedia, 1968, Vol. 45, No. 1A, Sept., 1967, pp. 17, 169, 170, 171 and 751.

*Primary Examiner*—Ronald W. Griffin
*Attorney, Agent, or Firm*—Johnston, Keil, Thompson & Shurtleff

[57] ABSTRACT

A process for the production of a high melting point thermoplastic polymer flame-proofed by melt-blending with a lactam-impregnated red phosphorus as the essential retardant at temperatures above 200° C. and the resulting flame-proofed thermoplastic polymer.

11 Claims, No Drawings

FLAME-PROOFING, HIGH MELTING POINT THERMOPLASTIC POLYMERS WITH LACTAM-IMPREGNATED RED PHOSPHORUS

This application is a continuation-in-part of our co-pending application, Ser. No. 102,144, filed Dec. 28, 1970 now abandoned. This invention relates to a method of incorporating red phosphorus into high melting point thermoplastic polymers.

Due to steady improvements in the mechanical and thermal properties of synthetic thermoplastics, these materials are being increasingly adopted for use where they are subjected to major mechanical and thermal stresses. However, their use at high temperatures increase the risk of combustion of the plastics materials, should overheating or flame-generation occur.

It is known that the addition of red phosphorus to casting resins and also to thermoplastics and foamed plastics materials provides effective flame-retardant properties (Belgian Pat. No. 715,110; U.S. Pat. No. 3,373,135; U.K. Pat. Nos. 1,112,139; 1,147,009 and 1,157,419; German published application DAS 1,173,641). In practice, effective flame-proofing is generally achieved with phosphorus concentrations of from 1 to 15% by weight of the thermoplastic composition. In the case of glass-fiber-reinforced polyamides, red phosphorus concentrations of from 0.5 to 5% by weight of the fiber-reinforced polyamides provide adequately flame-proofed products.

Regardless of the required concentration of red phosphorus, its incorporation into thermoplastic polymers often presents considerable difficulties, especially where such polymers have a high melting point or softening range so as to require high temperatures above 200° C. up to about 310° C. to achieve an effective melt-blending or homogenization and distribution of the red phosphorus in the polymer itself. Red phosphorus powder, which has particle sizes primarily in the range 0.01 to 0.15 mm but which may contain even finer portions, tends to produce a dust and thus frequently leads to fires, particularly in the presence of hot surfaces, which are unavoidable, above all when melt-blending or similarly processing thermoplastic polymers with high melting points.

It is generally known, for the purpose of achieving an even and fine distribution of the red phosphorus, to combine it with other fillers and to incorporate the resultant mixture into the resin, but this does not reduce the risk of dust formation and the fire hazard. Moreover, such a technique is only applicable when the molding composition requires the incorporation of fillers.

It is an object of this invention to provide a process which enables finely divided red phosphorus to be evenly incorporated as flame retardant into a synthetic thermoplastic polymer material at high temperatures without the risk of dust formation or spontaneous combustion.

It is another object of the invention to initially prepare red phosphorus as a flame retardant for synthetic thermoplastic materials such that it may be incorporated in a finely divided state and evenly into the high melting point thermoplastic material without the risk of dust formation or spontaneous combustion.

It is a further object of this invention to provide a flame-proofed, high melting point, synthetic thermoplastic polymer in which red phophorus as the flame retardant has been evenly incorporated in a finely divided state according to the process of the invention.

We have found that high melting point thermoplastic polymers flame-proofed with red phosphorus may be efficiently manufactured without the risk of dust formation and without any substantial combustion hazard by melt blending and uniformly incorporating into the thermoplastic polymer at a temperature above 200° C. a finely divided red phosphorus which has been impregnated with a lactam having from 4 to 12 carbon atoms, such incorporation being effected by conventional mixing or homogenizing techniques. The flame retardant constitutes a lactam-impregnated red phosphorus mixture consisting essentially of from 25 to 90% by weight of particulate red phosphorus and from 10 to 75% by weight of said lactam.

As important advantage of the use of a lactam-impregnated red phosphorus in accordance with the present invention is that during or after incorporation of the phosphorus/lactam mixture into a synthetic thermoplastic polymer material the lactam may be completely or partially recovered by distillation. The separation of the lactam from, say, a polymer melt may be effected at atmospheric pressure or by the application of a vacuum.

By lactam-impregnated red phosphorus we mean an intimate mixture of red phosphorus, preferably in the form of particles having an average particle size of substantially between 0.01 and 0.15 mm, with lactam in a weight ratio of from 90:10 to 25:75, preferably from 80:20 to 50:50. The mixture is preferably obtained by blending red phosphorus with appropriate amounts of lactam which is melted before, during or after blending.

Examples of highly suitable lactams of from 4 to 12 carbon atoms for the impregnation are those lactams which are solid at room temperature and which distill at atmospheric pressure below 300° C. and preferably below 200° C., such as pyrrolidone, caprolactam, enantholactam, octolactam and dodecanolactam, of which caprolactam is preferred. In general, the lactam should be a liquid below about 200° C. and a gas or vapor above this temperature to permit its volatization during the melt-blending procedure.

Particularly suitable high melting point thermoplastic polymers which may be flame-proofed using the lactam/red phosphorus mixtures are those which contain recurring polar groups such as —CONH—, —NH—COO—, —CR$^1$R$^2$—O—, in the backbone of the polymer. Particular examples are polyamides, polyurethanes, polyacetals and saturated polyesters and polyester amides, and also homopolymers and copolymers of olefinically unsaturated monomers such as styrene/acrylonitrile copolymers or propylene polymers. Examples of highly suitable polymers are linear polyamides, for example polylactams such as polycaprolactam, or linear polyamides derived from aliphatic dicarboxylic acids of from 4 to 18 carbon atoms and diamines of from 4 to 18 carbon atoms, such as nylon 6,6, nylon 6,10 or copolyamides. Other highly suitable polymers are stabilized polyformaldehyde or trioxane copolymers, and linear polyesters such as polyethylene terephthalate. All thermoplastic polymers of similar structures are generally useful for purposes of the present invention as long as they meet the requirement of a high-melting point of about 200° C. to 310° C. so that melt blending necessarily occurs in this range.

The incorporation of the red phosphorus, which has been impregnated with the lactam according to the invention, into the thermoplastic polymer composition may be effected batchwise or continuously by melt blending the impregnated red phosphorus with the polymer at a temperature of about 200° C. to 310° C., preferably from about 220° C. to 300° C. The initial polymer may be in granular or powdered form for admixture with the lactam-impregnated red phosphorus, and the premix of these components is then fed into an extruder for melt blending with concurrent or subsequent devolatilization. Alternatively, the phosphorus/lactam mixture may be added directly to molten polymer by feeding the mixture to an inlet of the extruder disposed downstream of the melting zone. Fillers such as glass fibers, chalk, asbestos, etc. may be added separately or together with the phosphorus/lactam mixture. Yet another method is to mix the phosphorus/lactam mixture with a small quantity of synthetic thermoplastic polymer material to form a masterbatch containing, for example, 50% by weight of red phosphorus and 50% of thermoplastic material, this masterbatch then being fed to an extruder in the manner described above together with further quantities of the thermoplastic polymer.

Specifically, the process may be carried out as follows: the thermoplastic material in granular form is premixed with the additives (lactam/red phosphorus mixture or required quantities of said masterbatch, and optionally dyes, lubricants, stabilizers, etc.) either continuously or batchwise, and the resulting premix is fed to an extruder where the granular material is melted and intimately and homogeneously mixed with the additives, the final mixture then being discharged in the form of a strand or ribbon. The extrudate is quenched, for example in a water bath, and the solidified material is then granulated. The granules are dried and hermetically packed. The granules may alternatively be produced by directly breaking up the flow of molten material as it leaves the extruder and then quenching the droplets formed.

It is advantageous to use an extruder equipped with so-called degassing or devolatilizing means. Conveniently, gaseous foreign materials are withdrawn through a port provided in the melting section of the barrel.

In addition to single-shaft and twin-shaft extruders, other suitable equipment for incorporating the lactam-impregnated red phosphorus into the thermoplastic material includes, in particular, disc kneaders and mixing rolls. The mixing or homogenizing zones of these devices may be heated in a conventional manner.

The "masterbatches" may be advantageously made, for example, as follows:

The thermoplastic granules are continuously fed to an extruder and melted in the melting zone thereof. The phosphorus/lactam blend is continuously added through a second inlet and evenly distributed throughout the molten thermoplastic material in the mixing zone of the extruder, the lactam preferably being removed in vacuo in the devolatilizing zone following the said mixing zone, whereupon the final mixture is discharged through dies and the extrudate quenched in a water bath and granulated in a granulating tube. After drying, the granules are hermetically packed. Here again, granulation may be effected directly at the die of the extruder. The concentration of red phosphorus in the masterbatch thus obtained is preferably between 20 and 75% by weight.

The concentration of red phosphorus in a thermoplastic material flame-proofed in accordance with the present invention, depending on the degree of flame-proofing required, is conveniently between 1.0 and 20% by weight, preferably between 1 and 8% by weight, based on the weight of the polymer.

In addition to the red phosphorus or the lactam-impregnated red phosphorus, the polymers may also contain lubricants, such as calcium stearate, zinc stearate, waxes, aliphatic dicarboxamides or dicarboxylic acid ester, and stabilizers, such as substituted phenols, naphthols or mercaptans, antistatic agents, soluble dyes and pigments, fillers, such as koalin or chalk, etc. of the usual kinds and in the usual concentrations. Suitable fibrous material for incorporation into the compositions are, for example, glass fibers made from alkali-free glass and having a diameter of from 8 to 10 $\mu$ and coated with one of the commercial sizes suitable for the plastics material in question, and also asbestos fibers having a length/diameter ratio of from 0.1 to 50:1, and whiskers, metal fibers and carbon fibers. The addition of any additives to the thermoplastic material may be effected before, during or after the addition of the lactam-impregnated red phosphorus.

The use of the lactam/red phosphorus mixtures of the invention enables thermoplastic compositions having excellent flame-retardant properties to be particularly efficiently produced without any technical difficulties. It is known, for example, that red phosphorus ignites spontaneously at about 260° C. so that its use as a flame retardant was practically excluded at high temperatures of about 200° to 310° C. Also, if red phosphorus alone is added to a polyamide melt at temperatures above about 190° C. and especially above 200° C., the melt explodes almost instantaneously because phosphines are formed from the phosphorus and the reductive melt and these phosphines ignite and explode spontaneously in contact with air. These specific hazards are fully avoided when working in accordance with the present invention.

The invention is further illustrated by the following Examples in which parts and percentages are by weight. The K values given were determined by the method described by H. Fikentscher in Cellulosechemie, 13, 58 (1932). The term "melt blended" is used in these examples and throughout this specification to define the mixing and fine distribution or homogenization of the particulate red phosphorus in a melt of the thermoplastic polymer. During this melt blending, the lactam impregnant may change from a solid to a liquid to a gas, depending upon the processing conditions, and may be at least partly or even substantially completely removed by volatilization.

EXAMPLE 1

74 parts of polycaprolactam (K value 73.0) are premixed in a 500 liter fluid mixer with the usual additives, 20 parts of chopped glass-fiber strands and 8 parts of caprolactam-impregnated red phosphorus (25% caprolactam) and the pre-mix is continuously fed to a twin-disc kneader. After melting, the material is passed to a mixing zone where it is intimately mixed for a short period at 220° to 260° C. It then passes to a devolatilizing zone where it is substantially feed from monomeric caprolactam under a vacuum of 50 mm of Hg before it is extruded through dies. The product is quenched, granulated and dried in the usual manner and part of it is hermetically packed while the other part is immediately injection molded to form shaped articles. There is thus obtained a glass-fiber-reinforced polycaprolactam of good flameretardant properties.

EXAMPLE 2

Following the general procedure described in Example 1, 91 parts of polyhexamethylene adipamide (K value 72.5) are premixed with the additives usually employed in nylon 6,6 injection molding compositions and with 12 parts of a mixture of 70% of red phosphorus and 30% of caprolactam, and the pre-mix is vigorously kneaded on a twin-disc kneader at 260°–300° C. and devolatilized without any technical problems occuring during processing of the impregnated red phosphorus. The granular product, obtained in the usual manner, posseses a K value of 73.8.

EXAMPLE 3

64 parts of polycaprolactam (K value 73.0) are continuously fed to the inlet of a twin-disc kneader together with the additives usually employed in polycaprolactam injection molding compositions. 30 parts of chopped strands and 8 parts of a red phosphorus/caprolactam mixture (40% lactam) are continuously fed to a second inlet disposed down-stream of the melting zone of the kneader. The heterogeneous mixture is vigorously kneaded for a short period at 220°–260° C. and the monomeric caprolactam is removed through a vacuum port down-stream of the mixing zone. The product is extruded as a strand or ribbon and then granulated.

EXAMPLE 4

62 parts of polyhexamethylene adipamide (K value 72.5) are continuously fed to the inlet of a twin-disc kneader together with additive. Through a second inlet, which is disposed downstream of the melting zone, there are continuously added 35 parts of powdered chalk and 4 parts of a mixture of 65% of red phosphorus and 35% of caprolactam, which mixture was obtained by a melting technique, and these second additives are readily incorporated in the molten polymer at 260°–300° C. After passing through the devolatilizing zone, in which the monomeric caprolactam is partially removed, the product is discharged through dies and is then granulated by a conventional hot granulator or an underwater granulator.

EXAMPLE 5 a. A red phosphorus/polyamide masterbatch is produced by continuously melting 50 parts of polycaprolactam in a twin-disc kneader and continuously addint to the melt, through a second inlet, 66,7 parts of a mixture of 80% of red phosphorus and 20% of caprolactam (prepared by a melting technique). After vigorous kneading at 220°–270° C., the monomeric caprolactam is removed through a vacuum port disposed downstream of the mixing zone, and the molten masterbatch is discharged and granulated in the usual manner.

b. Following the general procedure described in Example 1, 70 parts of polycaprolactam, 20 parts of chopped strands and 10 parts of the red phosphorus/-polyamide masterbatch prepared as described under (a) above are continuously pre-mixed, together with the usual additives, on a drum mixer, and the resulting premix is continuously fed to a twin-disc kneader, where it is melted, thoroughly mixed at 220°–260° C. and discharged in the usual manner. There is thus obtained a material having very good mechanical properties and good flame-retardant properties.

EXAMPLE 6

There are mixed, in a high-speed mixer, 100 parts of polycaprolactam granules, 0.2 parts of calcium stearate, 0.5 part of N-(p-hydroxyphenyl)-benzamide and 0.5 parts of Cadmium Yellow, and the resulting mixture is fed to a twin-screw extruder and melted at 230°–250° C., while 7 parts of a homogeneous mixture of 70% of red phosphorus and 30% of caprolactam are added to the melt through a second inlet. About 65–70% of the monomeric caprolactam introduced is recovered through a vacuum port and the remaining composition is discharged through a die-head in the form of strands, which are quenched in water and granulated, the granules being dried at 110° C.

EXAMPLE 7

Following the general procedure described in Example 3, 65 parts of a stable polyformaldehyde (K value 76, as measured in 1% solution in o-dichlorobenzene), 30 parts of chalk and 6.7 parts of a virtually homogeneous mixture of 75% of red phosphorus and 25% of caprolactam are continuously mixed in a twin-disc kneader at about 200° C., the caprolactam being removed by devolatilization. The resulting flame-retardant mixture is extruded through dies.

EXAMPLE 8

Following the general procedure described in Example 3, 61 parts of polyethylene glycol terephthalate, 30 parts of asbestos and 12 parts of a mixture of 60% of red phosphorus and 40% of caprolactam are mixed and melt-blended in a twin-disc kneader at 230°–250° C. The monomeric caprolactam is sucked off after mixing has been completed in the extruder.

The invention is hereby claimed as follows:

1. A composition comprising a high melting point, synthetic thermoplastic polymer selected from the group consisting of polyamides, linear polyesters and polyacetals and red phosphorus evenly incorporated into said polymer in a concentration ranging from 1 to 75% by weight based on the weight of the polymer, said composition being obtained by melt blending and uniformly incorporating into said polymer at a temperature above about 200° C. a lactam-impregnated red phosphorus mixture consisting essentially of from 25 to 90% by weight of particulate red phosphorus and from 10 to 75% by weight of lactam having from 4 to 12 carbon atoms.

2. A composition as claimed in claim 1 wherein said polymer is flame-proofed by a content of about 1 to 20% by weight of said red phosphorus.

3. A composition as claimed in claim 1 wherein said polymer is a masterbatch with a content of about 20 to 75% by weight of said red phosphorus.

4. A composition as claimed in claim 1 wherein the red phosphorus has a particle size of between about 0.01 and 0.15 mm.

5. A process for the manufacture of a high melting point, synthetic thermoplastic polymer selected from the group consisting of polyamides, linear polyesters and polyacetals which is flame-proofed with red phosphorus, which comprises impregnating a particulate red phosphorus with a lactam having from 4 to 12 carbon atoms to provide a mixture consisting essentially of from 25 to 90% by weight of red phosphorus and from 10 to 75% by weight of said lactam, and melt blending and uniformly incorporating said lactam/red phosphorus mixture into the thermoplastic polymer at a temperature of above about 200°C.

6. A process as claimed in claim 5 wherein said lactam/red phosphorus mixture is melt blended and uniformly incorporated into said thermoplastic polymer at a temperature of about 200° to 300° C.

7. A process as claimed in claim 5, wherein the lactam is at least partially recovered by distillation during or after incorporation of the lactam/red phosphorus mixture into the thermoplastic polymer.

8. A process as claimed in claim 5, wherein the lactam/red phosphorus mixture contains 50 to 80% by weight of red phosphorus and from 50 to 20% by weight of lactam.

9. A process as claimed in claim 5, wherein the lactam is caprolactam.

10. A process as claimed in claim 5, wherein the synthetic thermoplastic polymer is a linear polyamide.

11. A process as claimed in claim 5, wherein the synthetic thermoplastic polymer is a linear polyester.

* * * * *